Jan. 10, 1956  L. M. CURTISS  2,730,381
REDUCING WASHER ASSEMBLY FOR OVERSIZED HOLES
Filed Sept. 17, 1952

INVENTOR.
LAWRENCE M. CURTISS
BY
Warren S. Orton
ATTORNEY

United States Patent Office 2,730,381
Patented Jan. 10, 1956

2,730,381

REDUCING WASHER ASSEMBLY FOR OVERSIZED HOLES

Lawrence M. Curtiss, Mountainside, N. J., assignor to The Thomas & Betts Co., Elizabeth, N. J., a corporation of New Jersey Application September 17, 1952, Serial No. 309,994

5 Claims. (Cl. 285—30)

The invention relates broadly to an outlet box wall at its knock-out aperture, and specifically relates to a reducing washer for use as a mounting for an electric fitting in the knock-out opening in the wall of electric equipment such as cabinets, outlet junction boxes and the like.

It has been a known practice in this art to mount electric conduits and like fittings in the knock-out openings in conduit boxes by the use of a pair of plates between the marginal edges of which plates the wall of the box is clamped, usually by means of a screw connection at the center of the plates or by clamping means carried by the fitting.

This form of mounting has not proven satisfactory in actual practice because the plates must be pre-mounted on the fitting and secured in place by nuts threaded on the fitting, and in any case the plates are apt to slip relative to each other while being mounted in the knock-out opening of the wall on which they are to be secured and before they can be clamped in place.

An object of the invention is to provide a form of mounting which can be secured with its opening therethrough automatically centered in the knock-out opening and which can be secured in place even without the fitting being present, and thus function as a partial closure for the opening, and which mounting when so secured in place can subsequently accommodate a fitting or can be left with its reduced size of opening to accommodate conductors or conduits therefor passed through the opening in the mounting.

Broadly, the objective is attained by using two washer-like discs which are provided with integral interlocking means operable when the discs are located in position on opposite sides of the box wall at the knock-out opening to secure the discs in position with the part of the wall provided with the opening clamped between the discs, thereby to lock the mounting in place independently of and even in the absence of the fitting to be subsequently secured thereto.

In some situations it is required that metal fittings which are mounted in knock-outs and like openings in metal walls are required to be grounded onto the wall and this, of course, calls for a form of fitting mounting which will insure an electric path from the fitting or from the conductors carried by the fitting to the wall with the least possible ohmic resistance between the fitting and the wall.

Accordingly, another object of the invention is to provide a form of mounting which will insure a high degree of conductivity between the fitting and the wall. Broadly, this is attained, first, by providing thin wall clamping discs which are sufficiently flexible in their peripheral portions to accommodate themselves to the portion of the wall outlining the knock-out opening to insure a highly efficient form of interface therebetween capable of transmitting current therethrough with the least possible ohmic resistance even though the surface of the wall engaged by one or even both of the discs may not be strictly uniplanar, and, second, by providing powerful clamping means forming part of the fitting, supplementing the interlocks between the discs and operative to provide an extensive area of interface between the fitting and the mounting and between the mounting and the wall, capable of deforming the discs to provide flat inter-engaging conductive surfaces.

Various other objects and advantages of the invention will be in part obvious from an inspection of the accompanying drawings and in part will be more fully set forth in the following particular description of one form of reducing washer embodying the invention, and the invention also consists in certain new and novel features of construction and combination of parts hereinafter set forth and claimed.

Figure 1:
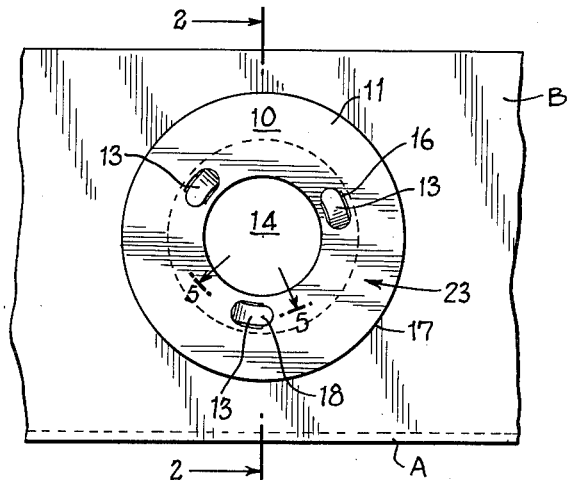
Fig. 1 is a view in elevation of a side wall of an outlet box provided with a knock-out aperture and equipped with a two-disc interlocked type of mounting constituting a preferred embodiment of the invention.

In the drawings there is disclosed a mounting designed to be fitted to a metallic outlet box A, which box includes a side wall B provided with a knock-out aperture C of the usual circular form.

The mounting 10, particularly forming the novelty of this disclosure, is formed of two identical discs 11 and 12 secured in coaxial relation by a plurality of interlocks 13, three of which are employed and equidistantly spaced apart in the illustrated showing.

Figure 6:
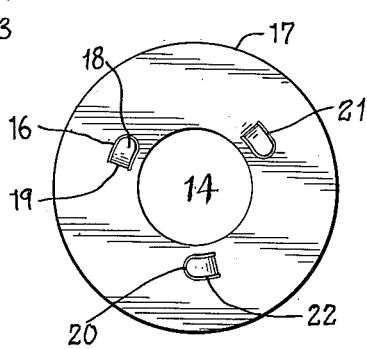
Fig. 6 is a plan view of either one of the two discs in the preceding figures, which make up the mounting herein featured.

As the discs are identical the detailed description of one will be sufficient for the other. Each disc as shown in Fig. 6 is punched out of a sheet of thin, slightly flexible stock sheet steel into a washer-like stamping with a hole 14 at its center. As a measure of the thickness of the discs it is noted in Fig. 4 that the material cross section of each disc is about that of the cross section of the wall B. Each disc has an external or all-over diameter larger than the diameter of the box aperture which the disc is to cover so as to provide a marginal edge 15 of sufficient radial width to lap for a material distance the portion of the wall which it is intended to engage.

Each disc is provided with a series of slots 16 somewhat U-shaped in plan and located in the instant case adjacent the hole 14. However, it is within the scope of the disclosure to locate the slots at the edge of the hole or even near or at the outer perimeter 17 of the disc.

The tongue of metal which originally occupied a slot is bent from the plane of its associated disc to form an offset tab 18. The tabs are all located with their length dimension in a tab circle whose center is also the center of the hole 14. The tabs are also of U-form in plan, are each centered in the slot from which it was bent, and their root ends 19 are integral with the disc from which they were bent.

In order to assist the tabs as they are inserted into the slots as hereinafter described it is suggested that their free ends 20 be rounded and that their widths be made slightly less than the width of the slots to provide a clearance 21 between each tab and the material from which it is bent. In this way there is avoided the possibility of an accidental binding between the edges of the tab of one washer and the edges of the tab slot of the other washer.

The tabs are located so that their outer edges 22 define a circle 23 whose center is at the center of the hole and which has a diameter only slightly less than the diameter of the box aperture C. In this way each disc and the mounting formed thereby are fitted to the aperture with the mounting hole 14 centered therein and in this way lateral play of the mounting in the wall is avoided.

Figure 5:
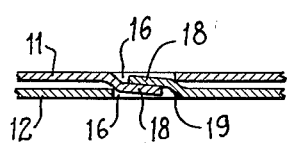
Fig. 5 is a detail of one of the three interlocks connecting the two discs and taken on the line 5—5 of Fig. 1.

The amount of offset of the tabs from the adjacent side of the disc controls the spacing apart of the discs which should be the thickness of the material of the box wall. In the illustrated case the free end of each of the tabs is bent outwardly away from its associated disc about two degrees, as best shown in Fig. 5.

In operation, that size of disc will be selected whose outer circle 23 comes nearest to fitting in the box aperture, and which has the proper size hole 14 at its center. A pair of such discs are assembled, one on one side and the other on the opposite side of the wall with their tabs projecting toward each other into the box aperture C and with the tabs of one disc initially offset circularly from the tabs of the other disc.

The discs are then relatively rotated with the disc 11 shown in Fig. 1 turned counterclockwise until the free, rounded ends 20 of the three tabs of each disc intrude into the three slots of the other disc. As the discs are so relatively rotated the tab of one disc of each set sides up the inclined of the associated tab of the other disc until the discs can be rotated no further and are interlocked as indicated in Fig. 5. At this time and as shown in Fig. 5 the free end of each tab fits snugly between the free end of the other tab and the end of the slot from which the other tab was bent. Each interlock thus forms in effect a coupling of the rotary pin-and-hole type for locking the discs to each other and therethrough to lock the mounting to the box.

Figure 2:
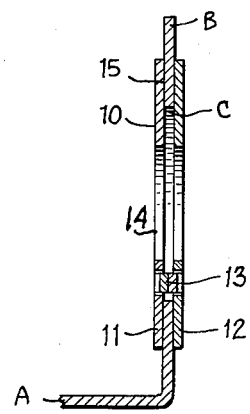
Fig. 2 is a transverse section taken on the line 2—2 of Fig. 1, looking in the direction indicated by the arrows.

When the three pairs of discs are so interlocked the mounting is complete and is locked securely in place in the aperture C as indicated in Figs. 1 and 2.

At this point the outer marginal edges 15 of the two discs are in frictional engagement with the wall and the mounting considered as a unit may be rotated while so held frictionally should it be desired to rotatively readjust the mounting.

With the assembly of the two discs thus interlocked and in place in the aperture there is provided a partial closure having a hole 14 of reduced size, that is, smaller than the box aperture C and through which smaller hole tools, electric cable, conduits, fittings and other equipment may be passed freely.

Figure 3:
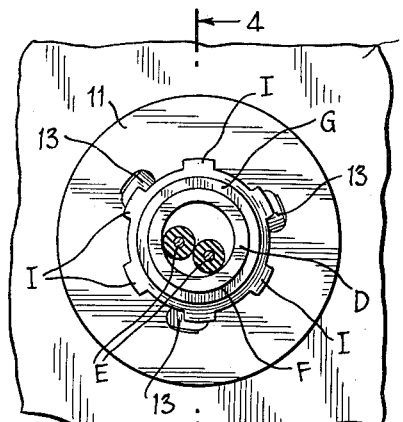
Fig. 3 is an elevational view similar to Fig. 1, with a fitting secured in position clamped to the mounting of Figs. 1 and 2, with the mounting forming an electric path between the fitting and the wall of the box.
Figure 4:
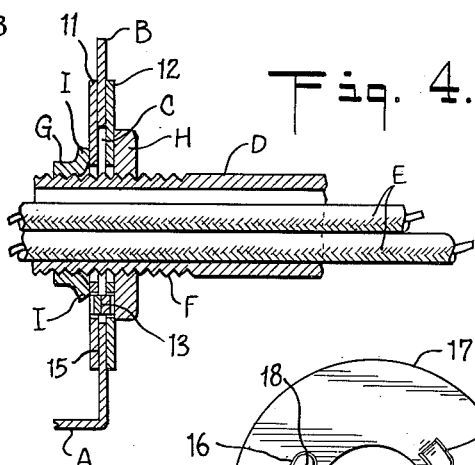
Fig. 4 is a transverse sectional view through Fig. 3 and taken on the line 4—4 of Fig. 3, looking in the direction indicated by the arrows.

For the purpose of showing how one such fitting may be installed on the mounting there is disclosed in Figs. 3 and 4 a steel conduit D through which is trailed a plurality of conductors E. The portion of the conduit which is at the registered holes 14 is externally threaded as shown at F, and a pair of nuts G and H engage the threads at F, are disposed on opposite sides of the mounting, and function when tightened to act as a squeeze clamp, tending to squeeze together the portions of the discs which contain the interlocks, thus acting to prevent accidental re-rotation of the discs into an unlocked relation. The inside nut G may function as a lock nut. The lock nut is provided with protruding resilient ears I (six being shown) on its outer periphery which dig into the inner washer 11 and also have a "wiping" action over the tabs 18 of the outer disc or washer 12, providing a cleaning action for the purpose of making an improved electrical connection. The marginal portion of the nut H outwardly of its threaded connection with the conduit D is solid, bears on the adjacent side of the wall B and laps the openings formed by the slots 16 to close the same and in this way avoid leakage into or from the box through these slots 16.

In those cases where it is desired to ground the conduit D onto the box A it is of advantage to make the solid annular marginal edge portions 15 of the discs sufficiently flexible in the portion thereof which laps the wall to be deformed by the squeeze pressure of the nuts. It is appreciated that outlet and similar boxes are either more or less rough castings or are formed of sheet metal without any machining done on them to provide smooth contacting surfaces. It not infrequently happens that the part of the wall about the apertures is not always uniplanar and, on the contrary, is inclined to be warped, sometimes as the result of carelessly punching the wall to form the apertures C.

With at least some degree of resiliency in the discs it is possible to apply sufficient pressure by the jamming of the nuts to force the marginal portions of the discs to conform themselves to whatever irregularities may be imposed on them by the surfaces of the box wall which they engage. The squeeze pressure of the nuts in their bearing engagement with the discs will tend to crush any oxide which may have formed on the related interfaces. Also, as the discs are thus caused to bear on the box wall with the powerful crushing action possible with the rugged nuts, the discs will tend to crush any oxides which may have formed on their interfaces.

In the event it is desired to demount any fitting for the time being in place, as, for instance, to replace it with a different size fitting, it is simply necessary to loosen the inner nut and withdraw the fitting outwardly away from the box, thus leaving the mounting in place as indicated in Figs. 1 and 2.

I claim:

1. A wall provided with an aperture of circular outline, conductor mounting means for forming an opening at the aperture having a diameter less than that of the aperture, said means comprising a pair of identical metallic discs at the aperture for at least partially closing the same, one disc disposed on one side and the other on the opposite side of the wall, each disc provided with the same number of slots extending therethrough arranged radially and circumferentially spaced apart, a portion of the discs within each slot being bent out of the plane of the associated disc to form a tab, each projecting into the aperture in lapping relation to a corresponding tab of the other disc, the tabs of each disc all extending in the same circumferential direction from their root ends and integral with the balance of their associated disc, the outer edges of the tabs defining a circle having a diameter substantially equal to that of the aperture whereby the tabs of such disc in their relation to the perimeter of the aperture coact to center it in the aperture and the tabs of each disc intruding rotatively into the tab slots of the other disc directly to interlock the two discs together and operating to secure the discs together in their position centered in the aperture with the wall clamped between the peripheral marginal portion of the two discs which lie externally of the interlocking lugs.

2. The structure defined in claim 1 and wherein the discs constitute flat washers of annular form and are each provided with a hole extending therethrough in mutually coaxial relation.

3. The structure defined in claim 2 and wherein a fitting provided with a threaded end extends freely through the registering holes in the washers and is otherwise independent of the mounting means, and squeeze means carried by said fitting in threaded relation therewith engaging opposite sides of the washers and operative to squeeze the same towards each other to cause the discs at their outer perimeters to bear on the wall therebetween and to cause the tabs to bear on each other and thus supplement by virtue of the squeeze pressure the initial interbearing of the tabs on each other by virtue of their inherent interlocking relation.

4. A mounting for reducing the size of the opening in the knock-out aperture in the wall of an outlet box, comprising two identical sheet metal stampings forming a pair of discs adapted to be assembled in parallel, spaced-apart relation on opposite sides of the box wall at its knock-out aperture in bearing engagement with the box wall, each disc provided with a vacant hole extending therethrough in registering relation with the hole in the other disc and fashioned to receive an attachment to the outlet box, each disc provided between its hole and its perimeter with a set of circularly spaced-apart slots and at least part of the material within the outline of each slot bent in the same direction and offset from the plane of the associated disc to an angle of about two degrees to form a substantially flat locking tab, the length dimension of the tabs of each disc extending in the same direction and disposed in a circle whose center is the center of the holes, the tabs of each disc rotatively engaging in the slots of the other disc to overlap the tabs in pairs, one disc of each pair sliding on the other to provide an extensive interengaging area of wedging surface, and operative to interlock the two discs at a plurality of points to secure the discs together in their parallel offset relation.

5. An article of manufacture for use in mounting an electric fitting in the knock-out aperture of an outlet box, comprising two identical discs for engaging opposite sides of the portion of the box containing the apertures, each provided adjacent its center with a vacant hole extending therethrough registering one with the other and adapted to receive the fitting and each disc provided with a set of slots circularly spaced apart about the hole, at least a portion of the material within the outline of each slot being of less width than the slot from which it was bent and bent therefrom in offset relation thereto to form an equal number of offset tabs, the tabs of each disc extending in the same direction and rotatively engaging in the slots of the other disc to overlap the tabs in pairs in wedging engagement and thus to secure them together in position in the box squeezed between the discs.

References Cited in the file of this patent

UNITED STATES PATENTS

| | | |
|---|---|---|
| 1,012,073 | Glasgow | Dec. 19, 1911 |
| 1,069,877 | Hurst | Aug. 12, 1913 |
| 1,106,964 | Phaler | Aug. 11, 1914 |
| 1,310,190 | Horton | July 15, 1919 |
| 1,391,396 | McMurtrie | Sept. 20, 1921 |
| 2,358,795 | Djidics et al. | Sept. 26, 1944 |
| 2,508,655 | Silverman | May 23, 1950 |
| 2,636,658 | Baumer et al. | Apr. 28, 1953 |